United States Patent [19]
Postlewaite et al.

[11] Patent Number: 6,015,092
[45] Date of Patent: Jan. 18, 2000

[54] SMART CARD READER HAVING ANGLED SMART CARD HOLDER

[76] Inventors: William M. Postlewaite, 262 South Beach Dr., Tarpon Springs, Fla. 34689; Stephen A. Ewald, 2612 West Granada St., Tampa, Fla. 33629

[21] Appl. No.: 09/019,223

[22] Filed: Feb. 5, 1998

[51] Int. Cl.[7] .................................................. G06K 7/00
[52] U.S. Cl. ........................................... 235/486; 235/492
[58] Field of Search ................................... 235/486, 492, 235/482, 380, 375

[56] References Cited

U.S. PATENT DOCUMENTS

| | | | |
|---|---|---|---|
| 5,563,400 | 10/1996 | Le Roux | 235/486 |
| 5,679,007 | 10/1997 | Potdevin et al. | 439/76.1 |
| 5,780,836 | 7/1998 | Iguchi et al. | 235/486 |
| 5,877,488 | 3/1999 | Klatt et al. | 235/486 |

*Primary Examiner*—Karl D. Frech
*Attorney, Agent, or Firm*—Smith & Hopen, P.A.; Ronald E. Smith

[57] ABSTRACT

A smart card reader includes a smart card holder that is mounted to a PCMCIA card at a ninety-degree angle. The upstanding position of the smart card holder makes it easier for users to insert smart cards into it. Moreover, the position of the smart card holder enables connectors for cellular telephones, modems, network cards and the like to be connected in an adjacent PCMCIA slot without interfering with the operation of the smart card reader. Moreover, the provision of a separate smart card holder frees space within the PCMCIA card for housing a modem or other device performing electrical functions. In this way, a single smart card reader provides two or more separate functions, neither of which interferes physically with adjacent PCMCIA cards. As such, electronics for cellular telephones, modems, network connections and the like may be incorporated into the PCMCIA portion of the reader with connectors for these applications being on the trailing end of a smart card reader's PCMCIA card. In a second embodiment, the connection between the smart card holder and the PCMCIA card is hinged so that the smart card holder may lie flat atop the PCMCIA card.

5 Claims, 5 Drawing Sheets

SMART CARD READER HAVING ANGLED SMART CARD HOLDER

BACKGROUND OF THE INVENTION

1. Field of the Invention

This invention relates, generally, to smart card readers and writers. More particularly, it relates to a smart card reader/writer that houses a modem, a phone connector, a network connector, or the like, and which has a folded card holder to provide improved access to connection jacks.

2. Description of the Prior Art

Smart card readers include a PCMCIA (Portable Computer Memory Card International Association) card (also known as a PC card) that is plugged into the PCMCIA drive bay of a computer. Although any computer may be provided with a PCMCIA slot, such slots are typically found in laptops. There are currently three types of such slots, known as Type I, Type II, and Type III; each of them include a 68-way connector.

Conventional smart card readers, such as disclosed in U.S. Pat. No. 5,679,007 to Schlumberger, are planar in configuration. The smart cards that are inserted into them are also planar in configuration; they have the approximate size of a credit card. A major problem with PCMCIA slots is that computer manufacturers typically provide a couple of slots with each computer, but due to space limitations, especially in the laptop or notebook computer niche, the slots are placed in closely spaced vertical registration with one another.

When the two PCMCIA slots are being used by PCMCIA cards for telephone modems, ethernet connections, portable hard drives or the like, both slots can be occupied by a different PCMCIA card and both cards can operate simultaneously without any problems because neither card physically interferes with the other.

However, when a first slot is occupied by a planar-in-configuration smart card reader, cables and/or jacks or other connector means from an adjacent card interfere with the smart card reader whether said adjacent card is a telephone modem card, a network card, or the like. This interference makes it difficult, if not impossible, for a user to properly use the smart card reader of the adjacent PCMCIA card. In particular, many PCMCIA modem cards have a device called an XJACK; the XJACK extends from the trailing end of the PCMCIA card when the leading end of said PCMCIA card is inserted into a PCMCIA slot. The male end of a telephone cable is connected into the XJACK to connect a first computer to a second computer via telephone lines. The telephone jack, which is plugged into an XJACK, blocks the entrance to the adjacent PCMCIA slot. This blockage prohibits the proper use of a planar smart card reader.

Thus there is a need for a smart card reader that, when inserted into a PCMCIA slot does not have its access physically blocked or hindered by an adjacent PCMCIA card requiring an external cable connection, so that two PCMCIA devices may be used simultaneously without physical interference from one another.

Another problem with PCMCIA cards is that they project from a computer in a horizontal plane when the computer is in use on a level surface. Such horizontal projection requires the user to insert the smart card in the same plane; the procedure is awkward and may require the user to lean over to align the smart card with the slot-receiving open end of the PCMCIA card.

Thus, there is also a need for a smart card reader that is more user friendly from the standpoint of smart card insertion.

However, in view of the art considered as a whole at the time the present invention was made, it was not obvious to those of ordinary skill in this art how the needed improvements could be provided.

SUMMARY OF THE INVENTION

The longstanding but heretofore unfulfilled need for an apparatus that overcomes the limitations of the prior art is now met by a new, useful, and nonobvious invention. The present invention is a smart card reader that includes a PCMCIA card disposed in a first plane and a smart card holder disposed in a second plane substantially normal to the first plane.

The smart card holder includes electrical contact means adapted to conductively contact a smart card received within the smart card holder.

A printed circuit board is housed within the PCMCIA card, and flexible conductor means extend from the electrical contact means in the smart card holder to the printed circuit board.

The smart card reader has a leading end adapted for connection to a PCMCIA slot in a portable computer and a distal end adapted for connection with external devices such as telephones, modems, network connections and the like.

Accordingly, jacks, cables, and other connectors may be attached to an adjacent PCMCIA card without physical blockage by the smart card reader. Moreover, insertion of a smart card into the upstanding smart card holder is facilitated, and a modem or other device may be housed within the PCMCIA card at the same time a smart card is positioned within the smart card holder.

A second embodiment includes a hinge means for hingedly interconnecting the PCMCIA card and the smart card holder. A friction latch means inhibits inadvertent folding of the smart card holder with respect to the PCMCIA card.

An indicator light may be mounted on the smart card holder, and means may be provided for activating the indicator light when the smart card is fully inserted into the smart card holder.

It is a primary object of this invention to provide a smart card reader that enables two closely spaced apart PCMCIA slots to be used simultaneously. For example, a first slot could be occupied by a smart card reader and a second, adjacent slot could be occupied by a PCMCIA card having jacks or cable connections secured thereto for performing modem, cellular telephone, and/or ethernet functions.

Another object is to provide a more user-friendly smard card reader by eliminating the need for a user to insert a smart card into a smart card reader that projects horizontally from the side of a computer.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
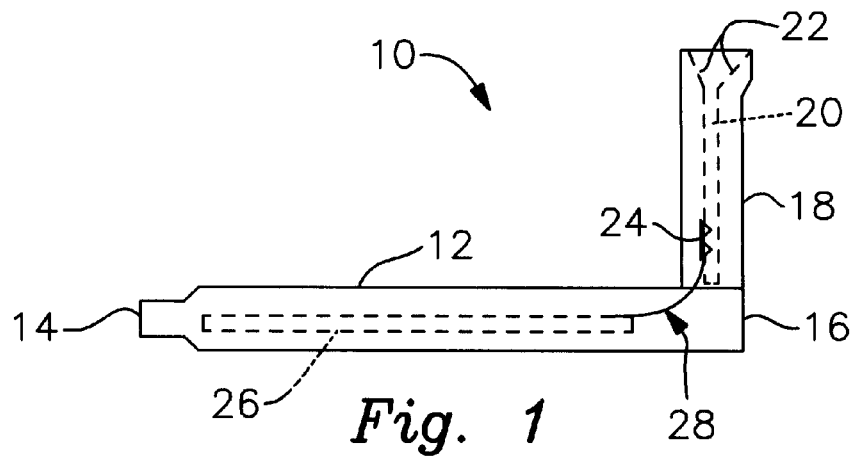
FIG. 1 is a side elevational view of the novel smart card reader having a smart card holder that is positioned normal to the plane of a PCMCIA card.
Figure 2:
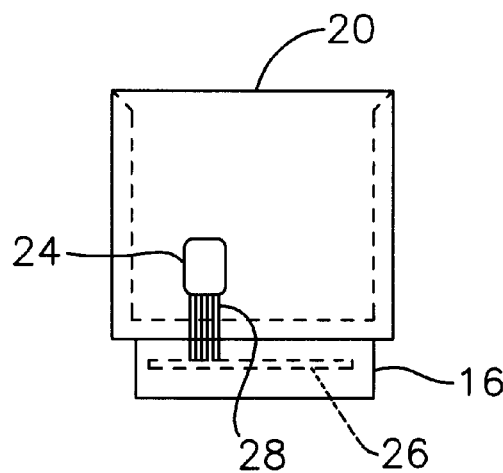
FIG. 2 is an end view of the reader depicted in FIG. 1.
Figure 3:
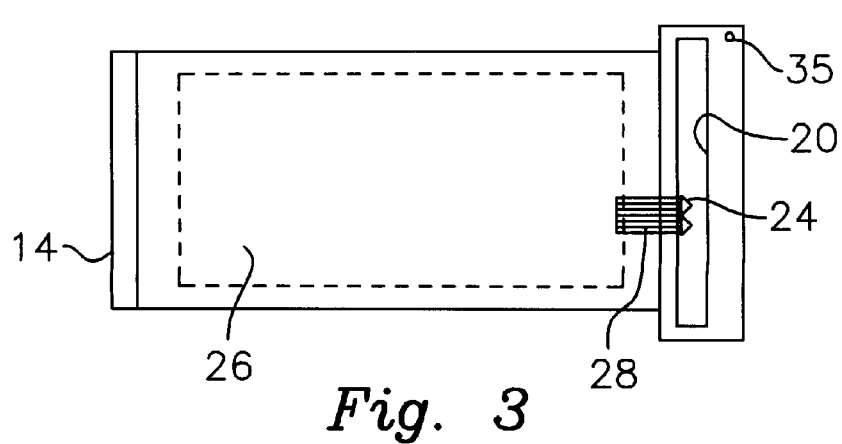
FIG. 3 is a top plan view of the reade depicted in FIG. 1.
Figure 4:
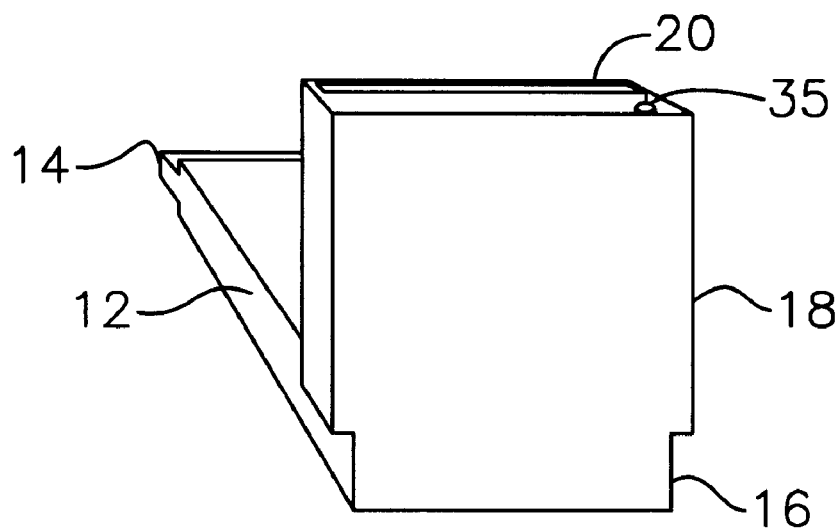
FIG. 4 is a perspective view thereof.
Figure 5:
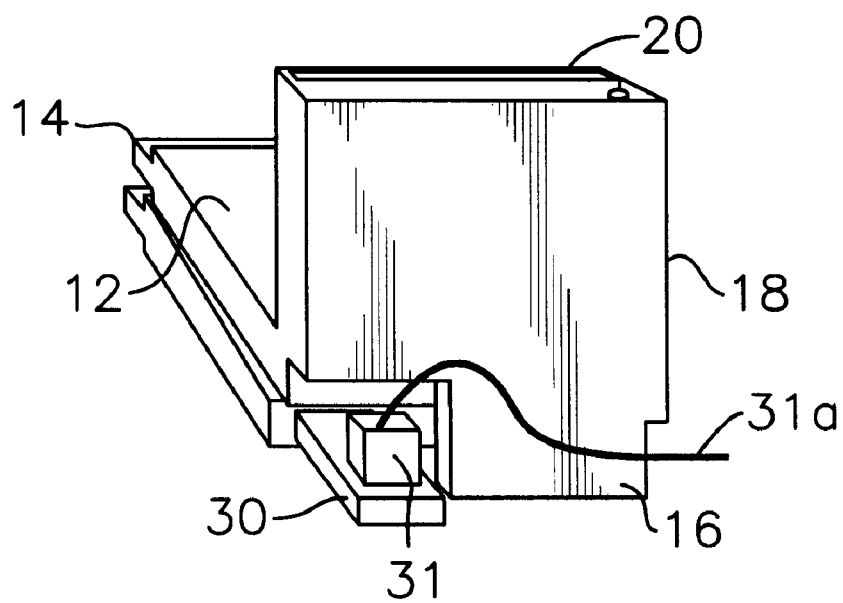
FIG. 5 is a perspective view of the reader of FIG. 1 when placed adjacent to a conventional smart card reader having a connector attached thereto.

Referring now to FIGS. 1–4, it will there be seen that an exemplary embodiment of the novel smart card reader is denoted as a whole by the reference numeral 10.

Smart card reader 10 includes a PCMCIA card 12 having a connector or leading end 14 and an open, smart card-receiving open or trailing end 16. Connector end 14 slides into a type I, type II, or type III PCMIA slot 68-way connector. The trailing end, as disclosed more clearly hereinafter, is adapted to receive various jacks or connectors for connection to cellular phones, modems, ethernet connections, and the like.

Smart card holder 18 is positioned normal to the plane of PCMCIA card 12 at its trailing end. The angle need not be exactly ninety degrees, but may vary by as much as thirty degrees from the perpendicular. In the claims that follow, the term "substantially normal" shall be interpreted as including this range of positions. Smart card holder 18 has a leading end secured to PCMCIA card 12 adjacent trailing end 16, and a free trailing end.

A smart card, not shown, is slideably inserted into slot 20 that is formed in said free trainging end of card holder 18; note beveled walls 22 that facilitate card introduction into slot 20. More importantly, it should be noted that the upstanding configuration of card holder 18 greatly facilitates smart card introduction into holder 18 because a user seated at a computer will find it much easier to insert a card in such upright holder 18 than in the horizontally-disposed holders of the prior art.

The smart card, which is unillustrated because it is well-known and forms no part of the invention per se, includes a memory chip or microprocessor having an electrical contact means for interface purposes. A smart card connector 24 is mounted in slot 20 so that said electrical contact means of said smart card conductively engages said connector 24 when a smart card is fully inserted into smart card holder 18. Connector 24, positioned within card holder 18, is in electrical communication with printed circuit board 26, positioned within PCMCIA card 12, by means of flexible conductors 28.

PCMCIA card 12 is slightly longer than a conventional PCMCIA card to accommodate card holder 18 and to provide ample clearance between said card holder 18 and a computer when PCMCIA card 12 is fully inserted into the PCMCIA slot of the computer. PCMCIA card 12 and card holder 18 may be molded as a single unit or as two separate units that are secured to one another by suitable means.

Figure 8:
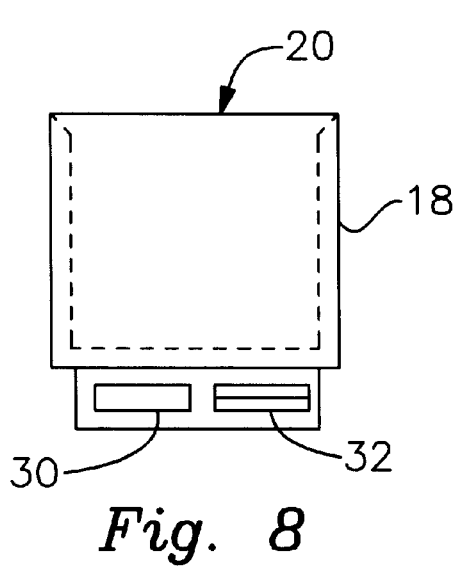
FIG. 8 is an end elevational view of an alternative embodiment having a first jack for a modem connection and a second jack for a cellular phone cable or an ethernet cable.
Figure 9:
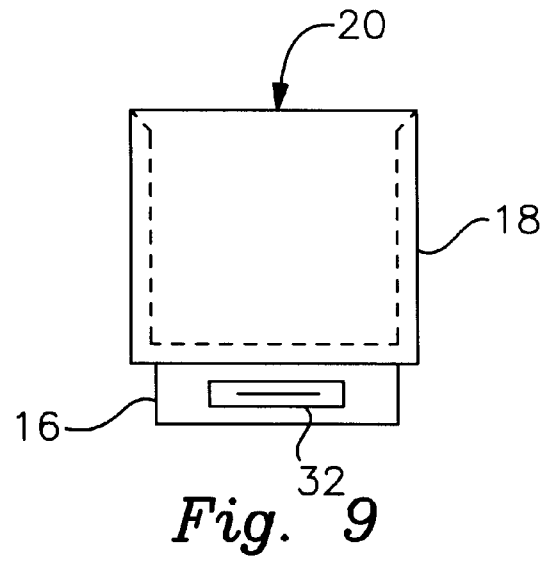
FIG. 9 is an end elevational view of an alternative embodiment having a single jack for a cellular phone cable or an ethernet cable.

FIGS. 5–8 depict an XJACK 30 for modem connections. FIGS. 8 and 9 depict alternative embodiments having XJACK 30 and a connector 32 (FIG. 8) or connector 32 only (FIG. 9) for a cellular phone or an ethernet cable. Note in FIG. 5 how smart card holder 18 is cut away to accommodate an XJACK connector 30 or similar connector that are positioned at the trailing end of PCMCIA card 12.

Figure 6:
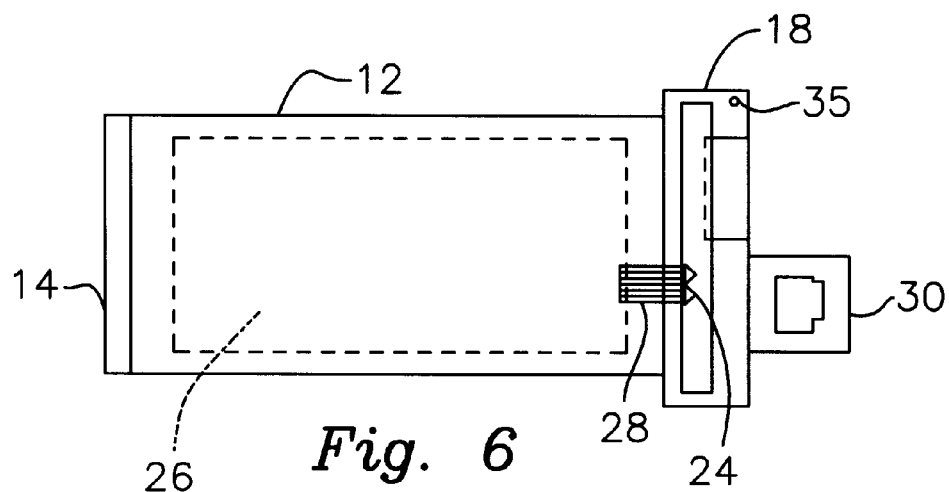
FIG. 6 is a top plan view of a smart card reader having an XJACK and a cellular phone jack built into the smart card holder.
Figure 7:
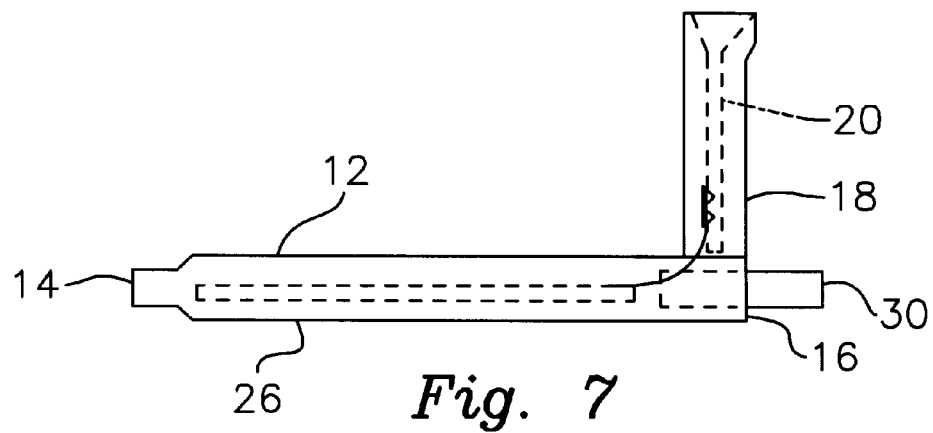
FIG. 7 is a side elevational view thereof.

FIG. 6 depicts a light 35 that activates to indicate full insertion of a smart card into smart card holder 18. The light may also be used, alternatively, to indicate when the smart card is in use, or a second light could be dedicated to that function.

Figure 10:
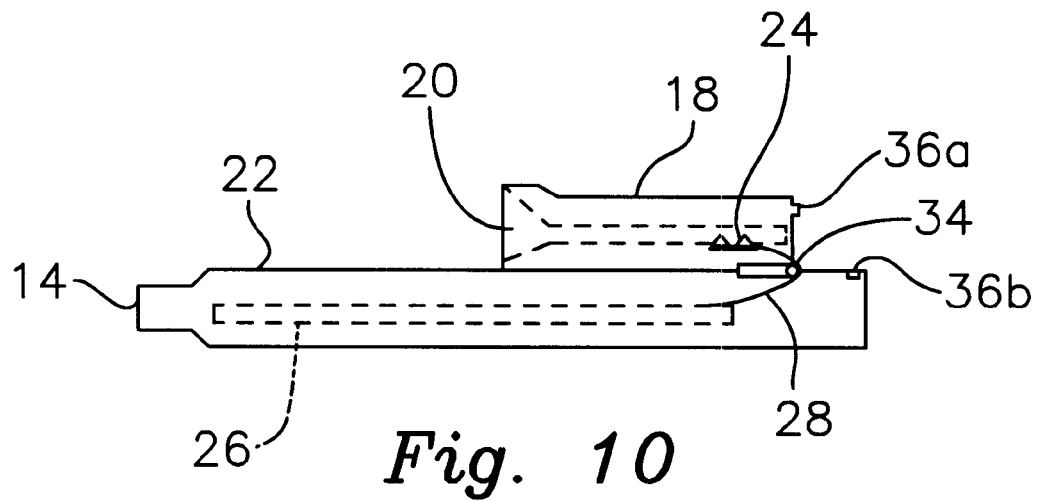
FIG. 10 is a side elevational view depicting the novel smart card reader when the smart card holder thereof is folded into overlying relation to the PCMCIA card thereof.
Figure 11:
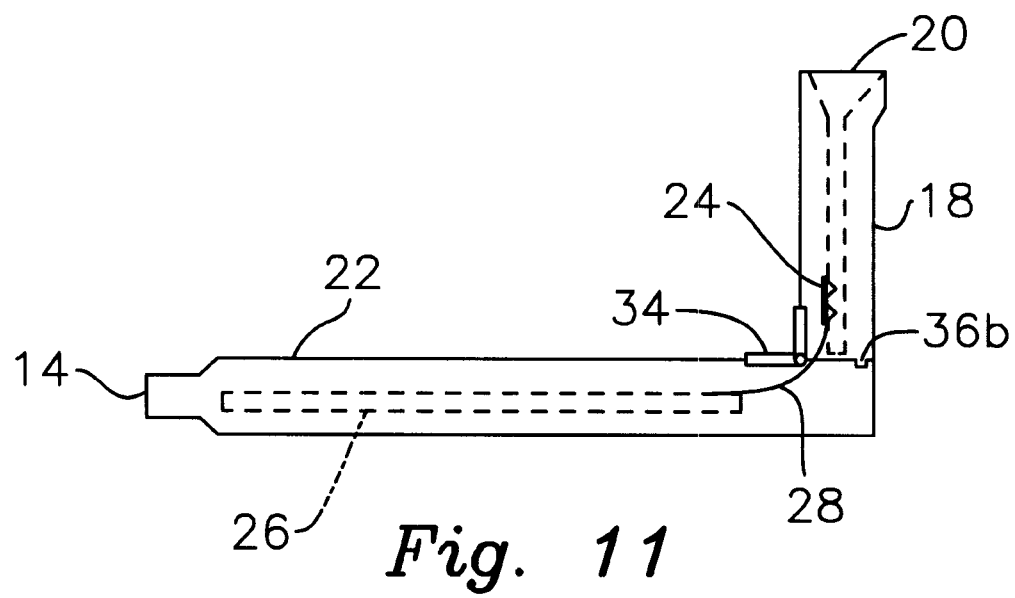
FIG. 11 is a side elevational view of the embodiment of FIG. 10 when in its unfolded, operable configuration.

The embodiment of FIGS. 10 and 11 includes a hinged connection between smart card holder 18 and PCMCIA card 12 so that said holder 18 may be folded as depicted in FIG. 10 for storage purposes. The hinge is denoted 34. A friction latch including a plug 36a formed in the lowermost end of smart card holder 18 is snap fittingly received within a socket 36b formed in the distal end 16 of PCMCIA card 12 to inhibit unwanted folding.

Figure 12:
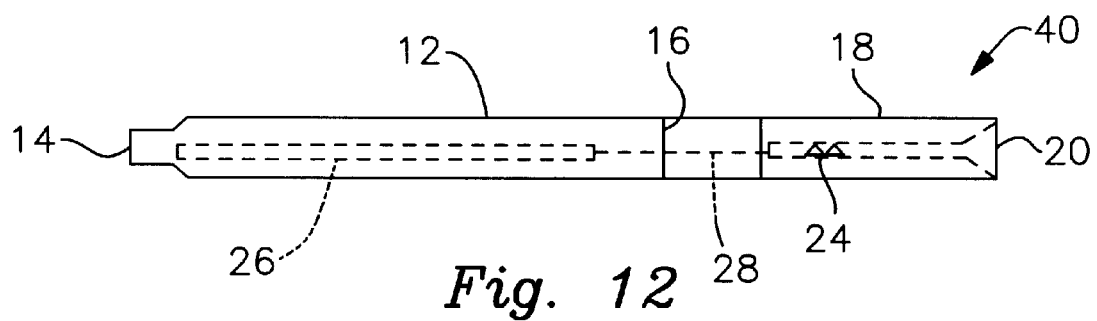
FIG. 12 is a side elevational view of another embodiment where the smart card holder is not positioned normal to the PCMCIA card, but where a cut out is provided to provide clearance for adjacent connectors or cables.
Figure 13:
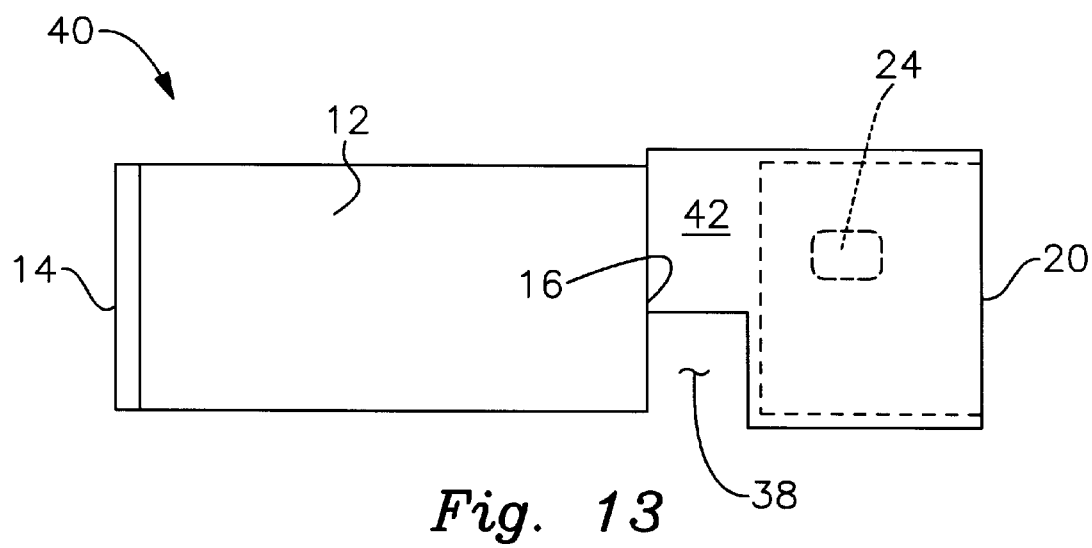
FIG. 13 is a top plan view of the embodiment depicted in FIG. 12.
Figure 14:
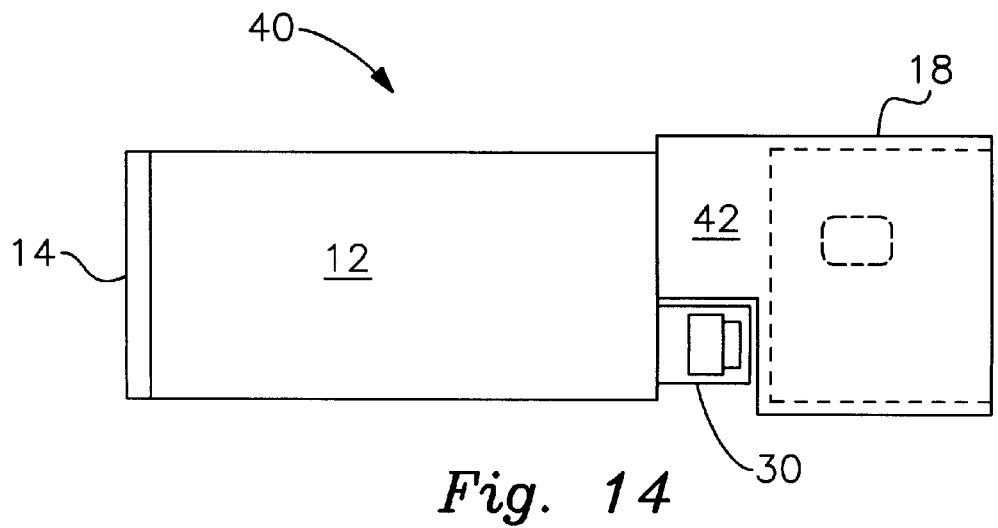
FIG. 14 is a top plan view like that of FIG. 13 but including a connector to better illustrate how the cut out accommodates such connector.

FIGS. 12–14 depict an embodiment 40 where smart card holder 18 is coplanar with PCMCIA card 12. To accommodate a connector such as connectors 30 or 32, a cut away 38 is formed in an extension 42 of card holder 18 to accommodate such a connector. This embodiment thus shares the disadvantage with prior art devices of poosibly requiring the user to lean over to properly align a smart card with slot 20, but it has the advantage that cut out 38 enables two closely spaced smart card readers to be connected simultaneously to modems, cellular phones, ethernet cables, or the like without physical interference from adjacent cables or connectors.

All embodiments disclosed herein, and their equivalents, have still another advantage. Since smart card holder 18 is a separate unit from PCMCIA card 12, extra space becomes available within said PCMCIA card 12. In prior art smart card readers, the hollow interior of PCMCIA card 12 is occupied by a smart card. Thus, where an application calls for simultaneous use of a smart card and a modem, two PCMCIA cards were needed heretofore: one for the smart card and one for the modem. Now that this invention has freed up, i.e., made available the interior of PCMCIA card 12, such space is now available to house the electronics and connectors required for a modem or network connection, or the like. Thus, a single smart card reader 10 provides ample space for both a modem and a smart card reader, thereby freeing up a second PCMCIA card for other use.

Clearly, then, a smart card holder that is disposed at a right angle, or within thirty degrees thereof or so, relative to the plane of a PCMCIA card, provides numerous advantages. The smart card is much easier to insert into the upright smart card holder, various jacks or cables may be connected to adjacent PCMCIA without physical obstruction, and the space normally occupied by a smart card becomes available to house a modem or other device.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A smart card reader, comprising:
    a PCMCIA card disposed in a first plane, said PCMCIA card having a leading end and a trailing end;
    a smart card holder disposed in a second plane substantially normal to said first plane;
    said smart card holder having a leading end connected to said PCMCIA card adjacent said trailing end of said PCMCIA card and said smart card holder having a free trailing end adapted to slidingly receive a smart card;
    said smart card holder including electrical contact means adapted to conductively contact a smart card received within said smart card holder;
    a printed circuit board housed within said PCMCIA card; and
    flexible conductor means extending from said electrical contact means in said smart card holder to said printed circuit board;
    whereby connector means may be attached to an adjacent PCMCIA card without physical blockage by said smart card reader;
    whereby insertion of a smart card into said smart card holder is facilitated; and
    whereby a modem may be housed within said PCMCIA card at the same time a smart card is positioned within said smart card holder.

2. The smart card reader of claim 1, further comprising a hinge means for hingedly interconnecting said PCMCIA card and said smart card holder.

3. The smart card reader of claim 2, further comprising a friction latch means for inhibiting inadvertent folding of said smart card holder with respect to said PCMCIA card.

4. The smart card reader of claim 1, further comprising an indicator light mounted on said smart card holder, and means for activating said indicator light when said smart card is fully inserted into said smart card holder.

5. The smart card reader of claim 1, wherein said smart card reader has a proximal end adapted for connection to a PCMCIA slot in a portable computer and a distal end adapted for connection to external devices such as telephones, modems, and network connections.

* * * * *